United States Patent [19]

Ikeura

[11] 4,314,540
[45] Feb. 9, 1982

[54] METHOD AND APPARATUS FOR IGNITION SYSTEM SPARK TIMING CONTROL WHERE EXHAUST GAS RECIRCULATION IS USED

[75] Inventor: Kenji Ikeura, Yokosuka, Japan

[73] Assignee: Nissan Motor Co., Ltd., Yokohama, Japan

[21] Appl. No.: 136,994

[22] Filed: Apr. 3, 1980

[30] Foreign Application Priority Data

Apr. 23, 1979 [JP] Japan .................................. 54-48990

[51] Int. Cl.³ .............................................. F02P 5/04
[52] U.S. Cl. .................................... 123/571; 123/415; 123/417
[58] Field of Search .......... 123/119 A, 117 D, 117 R, 123/571, 416, 417, 415

[56] References Cited

U.S. PATENT DOCUMENTS

| | | | |
|---|---|---|---|
| 3,853,103 | 12/1974 | Wahl | 123/117 |
| 3,915,132 | 10/1975 | Thornburgh | 123/571 |
| 3,969,614 | 7/1976 | Moyer | 235/150.21 |
| 4,009,699 | 3/1977 | Hetzler | 123/117 |
| 4,015,565 | 4/1977 | Auno | 123/117 D |
| 4,040,401 | 8/1977 | Marsee | 123/571 |
| 4,044,738 | 8/1977 | Williams | 123/119 A |
| 4,060,065 | 11/1977 | Hata | 123/119 A |
| 4,122,808 | 10/1978 | Vogelsberg | 123/571 |
| 4,124,006 | 11/1978 | Rodenkirch | 123/119 A |
| 4,135,480 | 1/1979 | Marsee | 123/571 |
| 4,164,032 | 8/1979 | Nohira | 123/571 |
| 4,177,777 | 12/1979 | Maruyama | 123/571 |
| 4,185,604 | 1/1980 | Nagaishi | 123/571 |
| 4,191,144 | 3/1980 | Nohira | 123/117 D |
| 4,193,381 | 3/1980 | Aoyama | 123/571 |
| 4,198,938 | 4/1980 | Harada | 123/119 A |

FOREIGN PATENT DOCUMENTS

| | | | |
|---|---|---|---|
| 2652753 | 2/1977 | Fed. Rep. of Germany | 123/571 |
| 2821578 | 11/1978 | Fed. Rep. of Germany | 123/571 |
| 2740044 | 8/1979 | Fed. Rep. of Germany | 123/571 |
| 2816404 | 10/1979 | Fed. Rep. of Germany | 123/571 |
| 2003671 | 3/1979 | United Kingdom | 123/571 |
| 2007767 | 5/1979 | United Kingdom | 123/571 |
| 2008193 | 5/1979 | United Kingdom | 123/571 |

Primary Examiner—Ronald B. Cox
Attorney, Agent, or Firm—Lane, Aitken, Kice & Kananen

[57] ABSTRACT

A method and apparatus for controlling ignition system spark timing where exhaust gas recirculation is employed. The value of spark advance is determined based upon engine operating parameters and exhaust gas recirculation rate is sensed. Correction means is provided which corrects the value of spark advance in accordance with the sensed value or actual valve of exhaust gas recirculation rate.

10 Claims, 6 Drawing Figures

METHOD AND APPARATUS FOR IGNITION SYSTEM SPARK TIMING CONTROL WHERE EXHAUST GAS RECIRCULATION IS USED

CROSS-REFERENCES TO RELATED APPLICATONS

References are made to the following related co-pending applications, each filed in the name of Kenji Ikeura on Apr. 3, 1980: (1) U.S. patent application Ser. No. 137,001; (2) U.S. patent application Ser. No. 136,959; (3) U.S. patent application Ser. No. 137,000; (4) U.S. patent application Ser. No. 136,996.

BACKGROUND OF THE INVENTION

The present invention relates to a method and apparatus for the control of an ignition system spark timing for a spark ignition internal combustion engine, and more particularly to a method and apparatus for the control of an ignition system spark timing where not only fuel consumption and power output are required, but also purification of exhaust gases is required.

Conventionally, the spark timing control where the exhaust gas recirculation (hereinafter abbreviated as EGR) takes place, employs a two-way or three-way ON-OFF valve, often called as "TV valve," which in response to the engine coolant temperature effects on-off control of atmosphere passages leading to an EGR control unit and a spark timing control unit, respectively. (For example, if the atmosphere passages are open, EGR is suspended and the spark advance is also suspended.) FIG. 1 shows the open and close states of the TV valve, wherein the axis of abscissa designates the coolant temperature of the engine, the wave-form line (1) represents the open and close states of the atmosphere passage leading to the EGR control unit, and the wave-form line (2) represents the open and close states of the atmosphere passage to the spark timing control unit. From this it will be understood that when the coolant temperature is higher than 95° C., the atmosphere passage to the EGR control unit is open to suspend EGR for the purpose of engine protection. When the coolant temperature is lower than 60°, the atmosphere passage to the EGR control unit is open to suspend EGR for the purpose of preventing deterioration in driveability. As will be understood from the wave-form line (2), when the coolant temperature is from 15° C. to 60° C. representing warm-up period of the engine, the atmosphere passage leading to the spark ignition control unit is open, thereby to suspend the spark advance control, suppressing the spark advance to a small value. This causes rapid warm-up and facilitates warm-up of the exhaust gas purifier. Within a range when the coolant temperature is lower than 15° C., an increase in spark advance is allowed to provide a sufficient increase in spark advance for the purpose of preventing deterioration in driveability. If EGR is effected during a temperature range from 15° C. to 60° C. when spark advance control is suspended, the driveability drops excessively because driveability which has been worsened during this temperature range owing to the suspension of spark advance control is further worsened by the addition of EGR, and besides no appreciable effect in reducing NOx is seen because during this range the amount of NOx has already been suppressed as a result of suspension of spark advance control. This explains the reasons why, as shown by wave-form lines (1) and (2), it has been desired to use the same temperature for the beginning temperature of the EGR and for the resuming temperature of the spark advance control, wherein the EGR begins above 60° C. and the spark advance control resumes above 60° C.

For the reason set forth above, it has been the conventional practice to combine spark timing control with EGR control to effect a control in response to the engine coolant temperature.

However, in this conventional combination control, disabling and enabling of EGR and spark advance control are effected in response to coolant temperature and the correction of spark advance value is not effected in response to a rise or drop in the exhaust gas recirculation rate, so that even if EGR is suspended, the value of spark advance remains unchanged such as at a coolant temperature of 95° C. shown in FIG. 1, thus causing knocking. The same phenomenon takes place too within a low temperature range. Besides, since the control is characterized by so called "two-values control" wherein there occurs a disabled-state or an abled-state, the value of spark advance can not correspond to the change even if minute EGR control is effected.

SUMMARY OF THE INVENTION

An object of the present invention is to correct value of spark advance in accordance with exhaust gas recirculation rate.

The method and apparatus of the invention concerns the control wherein value of spark advance is determined based upon engine operating parameters, exhaust gas recirculation rate is sensed, and the value of spark advance which is determined based upon engine operating parameters is corrected in accordance with the sensed value of exhaust gas recirculation rate.

Another aspect of the invention is in that a target value of exhaust gas recirculation is found by digital operation and a spark advance value is increased in accordance with an increase in the target value of exhaust gas recirculation rate.

Still another aspect of the invention is in that spark advance is decreased to a small value when exhaust gas recirculation is suspended.

Still another aspect of the invention is in that spark advance value is corrected in accordance with a difference between a target value of exhaust gas recirculation rate which is found by digital operation based upon various engine operating parameters and an actual value of exhaust gas recirculation rate which is sensed by an exhaust gas recirculation rate sensor. The correction is effected by digital calculation using a mathematical formula $K(T-A)$, where: K is a correction coefficient, T is a target value of EGR rate, and A is an actual value of EGR rate.

The invention may be better understood by reference to the detailed description which follows and to the drawings.

DETAILED DESCRIPTION OF THE INVENTION

Figure 1:
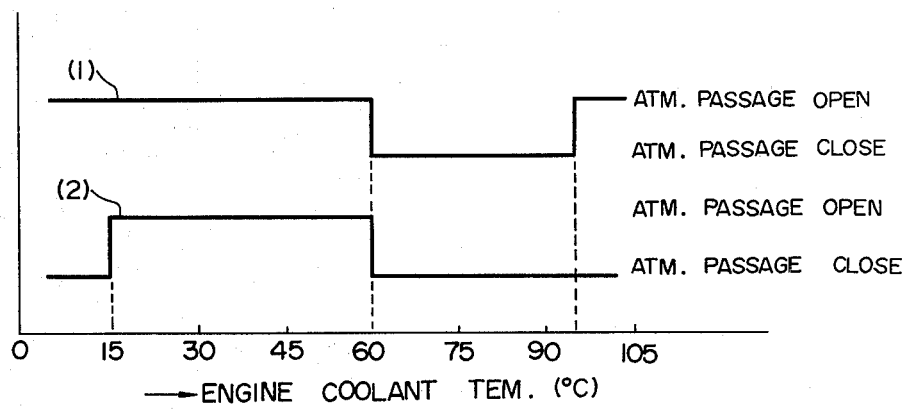
FIG. 1 is a graph illustrative of the operation of the conventional art.
Figure 2:
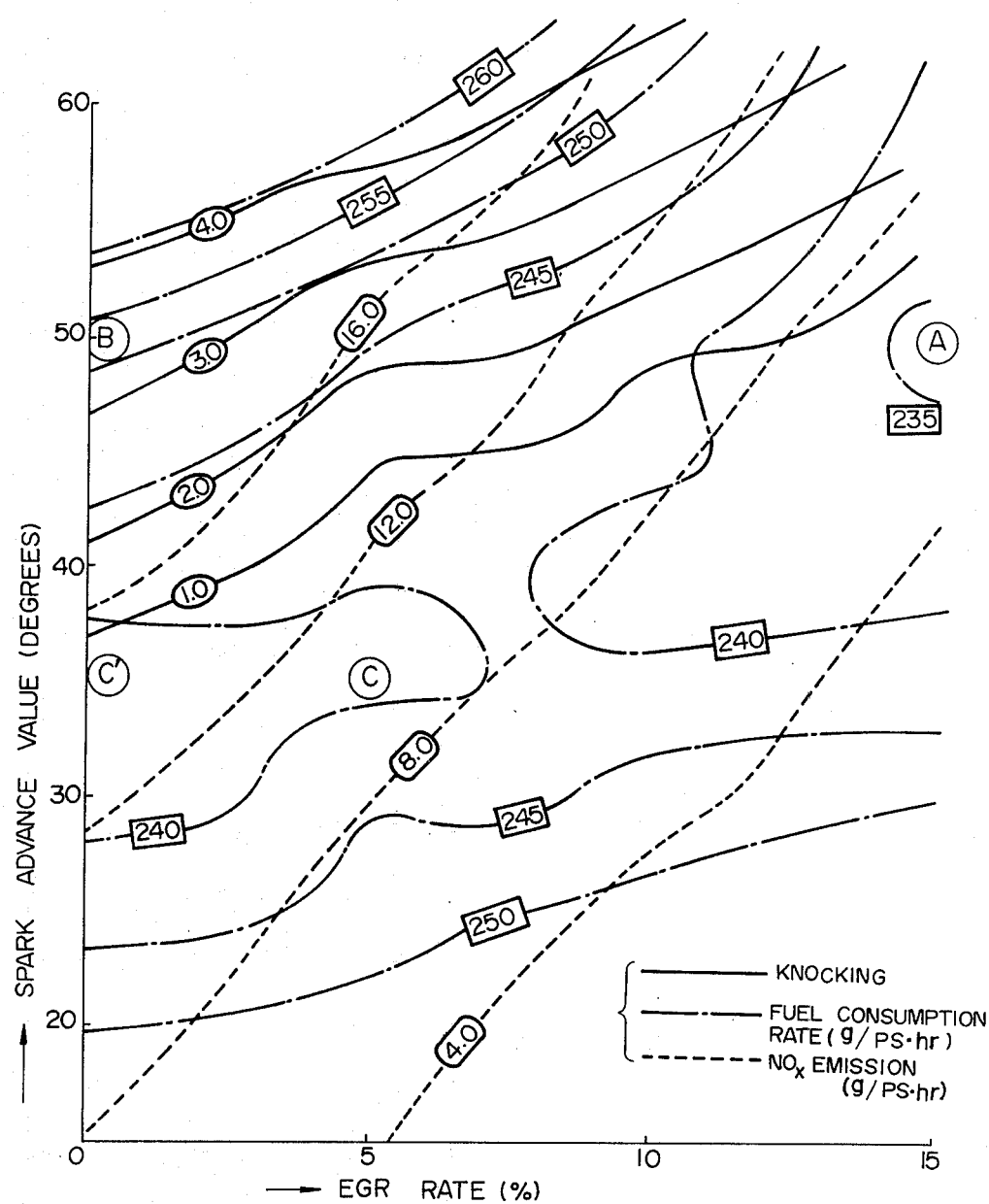
FIG. 2 is a graph illustrative of the control concept according to the present invention.

Referring to FIG. 2, the control system employed in the present invention will be concretely described. In FIG. 2, the axis of abscissa designates exhaust gas recirculation rate, the axis of ordinate spark advance value, solid line knocking (knocking is high as the number increases), one-dot chain line fuel consumption rate (unit; g/PS.hr), broken line the amount of $NO_x$ emission (unit; g/PS.hr). This graph shows the case of an electronic fuel injection type 6-cylinder gasoline engine. In this type of engine, when operated at the illustrated point A wherein exhaust gas recirculation rate is 15% and spark advance value is 50°, $NO_x$ emission from the engine is little and the fuel consumption is optimum, and therefore the engine is set at this point. When, however, EGR is suspended to prevent the tendency of the engine from being over heated, the exhaust gas recirculation rate=0%, and this means that the engine operates at a point B whereat the knocking is greater than 3, thus providing unallowable driveability state. Thus according to the present invention, concurrently with a decrease in the exhaust gas recirculation rate from 15% to 0%, the spark advance value is decreased by 15° from 50° down to 35°, thus arriving at the illustrated point C'. With this, the occurrence of knocking is prevented, the fuel consumption is improved by 15 g/PS.hr as compared to the point B, and $NO_x$ emission is decreased. If, instead of simply suspending the EGR to decrease the exhaust gas recirculation rate to 0%, an illustrated point C is selected where the spark advance value is 35° the same as that at the point C' and the exhaust gas recirculation rate is 5%, it is enough as a counter-measure to engine overheat, besides $NO_x$ emission level is less than that at the point C', and the fuel consumption rate is the same as that at the point C'.

Figure 3:
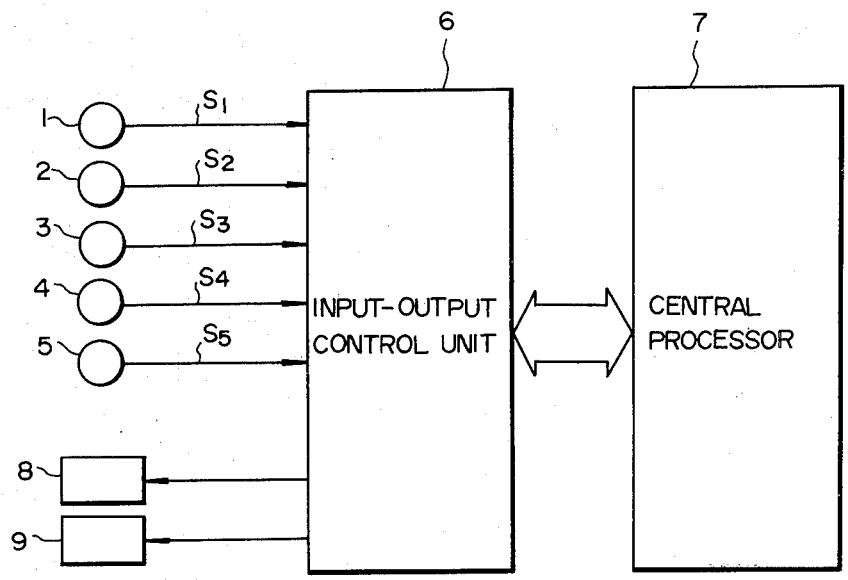
FIG. 3 is a block diagram of one embodiment of the present invention.

FIG. 3 is a block diagram showing an embodiment of the present invention. In FIG. 3, 1 designates a temperature sensor which provides a signal $S_1$ representing the coolant temperature of an engine, 2 designates an induction vacuum sensor which detects the induction vacuum of the engine to provide an induction vacuum signal $S_2$, 3 designates a basic angle sensor which provides basic angle pulses $S_3$ each upon expiration of a basic angle (for example, 120°) as the engine crank shaft rotates, 4 designates an unit angle sensor which provides unit angle pulses $S_4$ each upon expiration of an unit angle (for example, 1°) as the engine crank shaft rotates, 5 designates an exhaust gas recirculation rate sensor which detects the exhaust gas recirculation rate to provide an exhaust gas recirculation rate signal $S_5$.

These signals $S_1$ to $S_5$ (If necessary, another signals including a fuel injection pulse signal, a gear shift position signal, a vehicle speed signal may be employed) are read in via an input-output control unit 6 which is constructed of semiconductors by a central processor 7 including a ROM (read only memory), a RAM (random access memory), and a CPU (central processor unit). The central processor 7 detects the revolution speed of the engine from the basic angle pulse signal $S_3$ and the unit angle pulse signal $S_4$ of all of the read-in signals and detects the load of the engine from the signal $S_2$ from the load sensor 2, and finds from the detected revolution speed and load of the engine an exhaust gas recirculation rate to be issued to the EGR control unit and spark advance value to be issued to the spark advance control unit, and furthermore effects correction of the exhaust gas recirculation rate and correction of the spark advance value in response to the temperature signals $S_1$ from the temperature sensor 1, and issues the corrected exhaust gas recirculation rate and spark advance value to the EGR control unit 8 and the spark timing control unit 9 via the input-output control unit 6. It will be noted that, the signal $S_5$ from the exhaust gas recirculation rate sensor 5 is not used.

Figure 4:
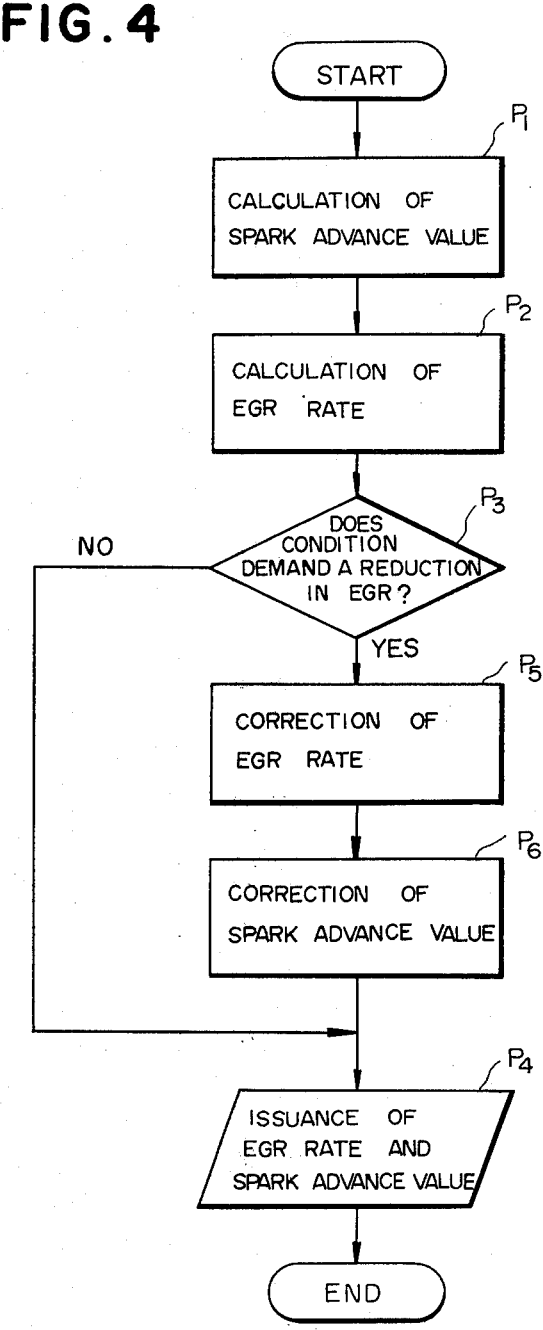
FIGS. 4, 5 and 6 are flow charts illustrative of the operation of the central processor.

The operation of the central processor 7 to perform the above-mentioned function is illustrated by a flow chart shown in FIG. 4. When the program starts, in a step $P_1$ and in a step $P_2$ a spark advance value and an exhaust gas recirculation rate are found based upon the revolution speed and load of the engine, in the subsequent step $P_3$ the decision is made whether or not the condition including engine coolant temperature, load, vehicle speed, etc demands a reduction in the exhaust gas recirculation rate, and if the result of the decision is "NO" the program goes to a step $P_4$ to allow the output of the spark advance value and the exhaust gas recirculation rate determined by the steps $P_1$ and $P_2$, respectively, and if it is decided, in the step $P_3$, that the exhaust gas recirculation rate be decreased, the program goes to a step $P_5$ wherein the correction of the exhaust gas recirculation rate takes place, in the following step $P_6$, value of spark advance is corrected in accordance with the corrected value of exhaust gas recirculation rate, and these corrected values (the correction is effected in accordance with the characteristic shown in FIG. 2) of the exhaust gas recirculation rate and spark advance value are issued via the step $P_4$.

Figure 5:
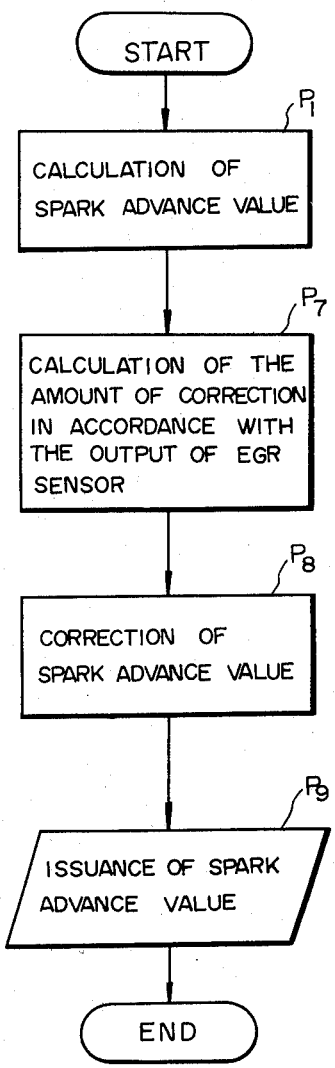

FIG. 5 is a flow chart of the operation wherein there is employed the output signal $S_5$ of the exhaust gas recirculation rate sensor 5 which is shown in FIG. 3. In a step $P_1$ a value of spark advance is found by calculation based upon the engine revolution speed and load. In the subsequent step $P_7$ the amount of correction is calculated based upon exhaust gas recirculation rate signal $S_5$, if necessary another information such as engine coolant temperature, intake air flow, engine revolution speed and throttle opening degree may be used for the calculation. In a step $P_8$ that value of spark advance which has been calculated in the preceding step $P_1$ is corrected by that correction amount which has been calculated in the step $P_7$ and then issued via step $P_9$. In this case, the value of spark advance calculated in the step $P_1$ is determined on the assumption that there is no EGR, the correction of this value is in a direction so as to increase the value of spark advance in response to EGR control.

Figure 6:
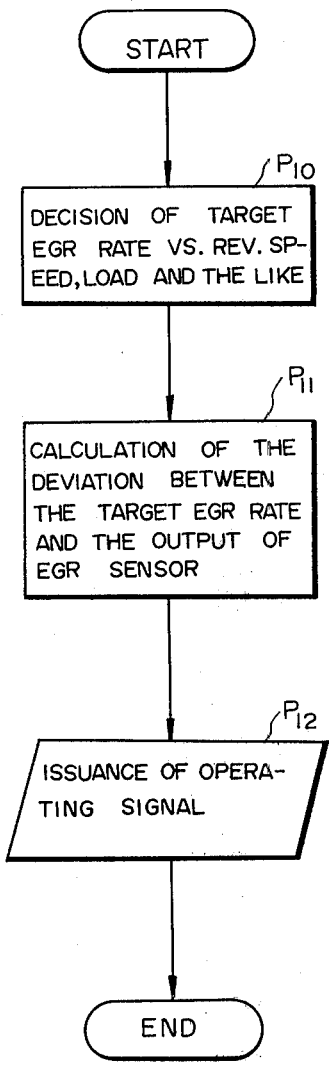

FIG. 6 is a flow chart illustrative of the operation of the central processor 7 to determine value of an operating or control signal for EGR. In a step $P_{10}$ the target value of exhaust gas recirculation rate is decided based upon the engine revolution speed and load, in the subsequent step $P_{11}$ the deviation or difference between the target value of exhaust gas recirculation rate and the actual value of exhaust gas recirculation rate, i.e., signal $S_5$ of the exhaust gas recirculation rate sensor 5, is found, and such an operating signal as to reduce the deviation to zero is issued via a step $P_{12}$ to the EGR control unit.

In the preceding embodiment the description went on the assumption that the exhaust gas recirculation rate is used, but the exhaust gas recirculation rate may be replaceable with exhaust gas recirculation amount because they are interchangeable if reference is made to the other informations representing the operating state of the engine. The exhaust gas recirculation rate can be provided from such a value as the pressure of the exhaust gas recirculation passageway, which varies in response to the variation of the exhaust gas recirculation only by suitable calculation.

It will now be understood from the preceding description that according to the present invention, the conventional insufficiencies, such as the occurrence of knocking upon suspension of EGR, the deterioration of fuel economy, and excessive emission of $NO_x$, are solved and, furthermore.

The start switch 1 is entirely conventional and may be a pair of contacts which are closed while the engine startor motor is in operation.

The basic angle sensor and unit angle sensor are also conventional and may be in the form of a detecting unit 24 described in and is incorporated herein by reference in U.S. Pat. No. 4,015,565, filed Apr. 5, 1977 in the name of Aono et al. and entitled "SPARK-ADVANCE CONTROL APPARATUS FOR INTERNAL COMBUSTION ENGINE" or may be in the form of a speed-electrical transducer 10 described in and is incorporated herein by reference in U.S. Pat. No. 3,853,103, filed Dec. 10, 1974 in the name of Wahl et al. (assignee: Robert Bosch GmbH) and entitled "IGNITION TIMING CONTROL SYSTEM FOR INTERNAL COMBUSTION ENGINE IGNITION SYSTEMS."

A way to find or sense revolution speed of engine, i.e., engine rpm, based upon signal from the unit angle sensor is conventional and described in the above-mentioned U.S. Pat. No. 3,853,103. In this respect, reference is made to U.S. Pat. No. 3,969,614, filed July 13, 1976 in the name of Moyer et al. and entitled "METHOD AND APPARATUS FOR ENGINE CONTROL" and reference is also made to U.S. Pat. No. 4,009,699, filed Mar. 1, 1977 in the name of Hetzler et al. and entitled "DIGITAL IGNITION SPARK TIMING ANGLE CONTROL WITH READ ONLY MEMORY."

The inventor has used a breakerless ignition system employing an ignition coil and a power transistor.

A way to determine the instance of ignition based upon binary signals of the basic angle sensor and unit angle sensor is disclosed in U.S. Pat. No. 3,853,103 in the name of Wahl et al. and U.S. Pat. No. 4,015,565 in the name of Aono et al.

In a four-cylinder, four-cycle internal combustion engine, one each ignition pulse must be obtained after each revolution of the crank shaft by 180°; 180° after the first ignition pulse is derived, a second basic angle pulse must then be provided by the basic angle sensor. In this case, the basic angle sensor must be designed to provide a basic angle pulse after each revolution of the crank shaft by 180°.

In a six-cylinder, four-cycle internal combustion engine, one each ignition must be obtained after each revolution of the crank shaft by 120°; 120° after the first ignition pulse is derived, a second basic angle pulse must then be provided by the basic angle sensor. In this case, the basic angle sensor must be designed to provide a basic angle pulse after each revolution of the crank shaft by 120°.

What is claimed is:

1. A method for the control of an ignition system spark timing for a spark ignition internal combustion engine, said method comprising the steps of:
   determining value of spark advance based upon engine operating parameters of the engine;
   sensing exhaust gas recirculation rate; and
   correcting the value of spark advance which is determined based upon engine operating parameters in accordance with the sensed value of exhaust gas recirculation rate.

2. A method as claimed in claim 1, including the steps of:
   finding by digital operation a target value of exhaust gas recirculation rate based upon engine operating parameters; and
   increasing the value of spark advance in accordance with an increase in the target value of exhaust gas recirculation rate and decreasing the value of spark advance in accordance with a decrease in the target value of exhaust gas recirculation rate.

3. A method as claimed in claim 1, including the step of:
   decreasing spark advance to a small value when exhaust gas recirculation is suspended.

4. A method as claimed in claim 1, wherein
   said sensing step includes sensing an actual value of exhaust gas recirculation rate, and wherein
   said correcting step includes correcting the value of spark advance based upon the actual value of exhaust gas recirculation rate, engine speed and load.

5. A method as claimed in claim 1, including the step of:
   finding by digital operation a target value of exhaust gas recirculation rate based upon engine operating parameters; and wherein
   said sensing step includes sensing an actual value of exhaust gas recirculation rate, and wherein
   said correcting step includes correcting the value of spark advance in accordance with the difference between the target value and the actual value of exhaust gas recirculation rate.

6. An apparatus for the control of an ignition system spark timing for a spark ignition internal combustion engine, said apparatus comprising:
   means for determining value of spark advance based upon engine operating parameters of the engine;
   exhaust gas sensor for sensing exhaust gas recirculation rate; and
   correction means for correcting the value of spark advance which is determined based upon engine operating parameters in accordance with the sensed value of exhaust gas recirculation rate.

7. An apparatus as claimed in claim 6 including:
   means for finding by digital operation a target value of exhaust gas recirculation rate based upon engine operating parameters, and wherein:
   said correction means increases the value of spark advance in accordance with an increase in the target value of exhaust gas recirculation rate and decreases the value of spark advance in accordance with a decrease in the target value of exhaust gas recirculation rate.

8. An apparatus as claimed in claim 1, wherein
   said correction means decreases spark advance to a small value when exhaust gas recirculation is suspended.

9. An apparatus as claimed in claim 1, wherein
   said exhaust gas sensor for sensing an actual value of exhaust gas recirculation rate, and wherein
   said correction means corrects the value of spark advance based upon the actual value of exhaust gas recirculation rate, engine speed and load.

10. An apparatus as claimed in claim 1, wherein
    said correction means corrects the value of spark advance in accordance with the difference between a target value of exhaust gas recirculation rate which is determined by digital operation based upon engine operating parameters and an actual value of exhaust gas recirculation rate.

* * * * *